(12) United States Patent
Christensen et al.

(10) Patent No.: US 11,245,541 B2
(45) Date of Patent: Feb. 8, 2022

(54) REQUIRED MEETING PARTICIPANT IDENTIFICATION

(71) Applicant: Lenovo (Singapore) Pte. Ltd., Singapore (SG)

(72) Inventors: Tobias Christensen, San Francisco, CA (US); Matthew William Fardig, Boonville, IN (US); Philip L. Childs, Fort Wayne, IN (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/834,773

(22) Filed: Mar. 30, 2020

(65) Prior Publication Data
US 2021/0306171 A1   Sep. 30, 2021

(51) Int. Cl.
| | | |
|---|---|---|
| *H04L 12/18* | (2006.01) | |
| *H04L 29/06* | (2006.01) | |
| *G06Q 10/10* | (2012.01) | |

(52) U.S. Cl.
CPC ......... *H04L 12/1822* (2013.01); *G06Q 10/10* (2013.01); *G06Q 10/109* (2013.01); *G06Q 10/1095* (2013.01); *H04L 12/18* (2013.01); *H04L 12/1818* (2013.01); *H04L 65/1069* (2013.01); *H04L 65/4038* (2013.01); *G06Q 10/1093* (2013.01)

(58) Field of Classification Search
CPC . H04L 12/1822; H04L 12/18; H04L 65/4038; H04L 65/1069; H04L 12/1818; G06Q 10/1095; G06Q 10/109; G06Q 10/10
See application file for complete search history.

(56) References Cited

U.S. PATENT DOCUMENTS

| | | | | |
|---|---|---|---|---|
| 8,918,464 | B1 * | 12/2014 | Mei | H04M 3/56 709/204 |
| 2018/0351756 | A1 * | 12/2018 | Dave | H04N 7/15 |
| 2019/0334907 | A1 * | 10/2019 | Rodden | G06Q 10/063116 |
| 2019/0392469 | A1 * | 12/2019 | Tietzen | G06Q 30/0279 |
| 2020/0112450 | A1 * | 4/2020 | Chhabra | H04L 65/1069 |
| 2020/0396065 | A1 * | 12/2020 | Gutierrez-Sheris | H04L 67/1095 |

* cited by examiner

*Primary Examiner* — Michael A Keller
(74) *Attorney, Agent, or Firm* — Ference & Associates LLC

(57) ABSTRACT

One embodiment provides a method, including: identifying, with reference to a predetermined ruleset for an online meeting, a list of eligible required participants; identifying, using at least one identity-determining technique, identities for present participants in the online meeting; determining, with reference to the predetermined ruleset and upon comparison of the list of the eligible required participants to the identified identities of the present participants, whether a minimum threshold number of the eligible required participants are present in the online meeting; and performing an action based upon the determination. Other aspects are described and claimed.

18 Claims, 3 Drawing Sheets

REQUIRED MEETING PARTICIPANT IDENTIFICATION

BACKGROUND

Individuals frequently utilize information handling devices ("devices"), for example laptop and/or personal computers, tablet devices, smart phones, and the like, to participate in remote meetings. More particularly, an individual may utilize their device to connect to these remote sessions via a meeting application. Using the meeting application, an individual may interact and communicate with other meeting attendees (e.g., via audible input, text input, a combination thereof, etc.), some or all of which may be located in a different geographic location.

BRIEF SUMMARY

In summary, one aspect provides a method, comprising: identifying, with reference to a predetermined ruleset for an online meeting, a list of eligible required participants; identifying, using at least one identity-determining technique, identities for present participants in the online meeting; determining, with reference to the predetermined ruleset and upon comparison of the list of the eligible required participants to the identified identities of the present participants, whether a minimum threshold number of the eligible required participants are present in the online meeting; and performing an action based upon the determination.

Another aspect provides an information handling device, comprising: a processor; a memory device that stores instructions executable by the processor to: identify, with reference to a predetermined ruleset for an online meeting, a list of eligible required participants; identify, using at least one identity-determining technique, identities for present participants in the online meeting; determine, with reference to the predetermined ruleset and upon comparison of the list of the eligible required participants to the identified identities of the present participants, whether a minimum threshold number of the eligible required participants are present in the online meeting; and perform an action based upon the determination.

A further aspect provides a product, comprising: a storage device that stores code, the code being executable by a processor and comprising: code that identifies, with reference to a predetermined ruleset for an online meeting, a list of eligible required participants; code that identifies, using at least one identity-determining technique, identities for present participants in the online meeting; code that determines, with reference to the predetermined ruleset and upon comparison of the list of the eligible required participants to the identified identities of the present participants, whether a minimum threshold number of the eligible required participants are present in the online meeting; and code that performs an action based upon the determination.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
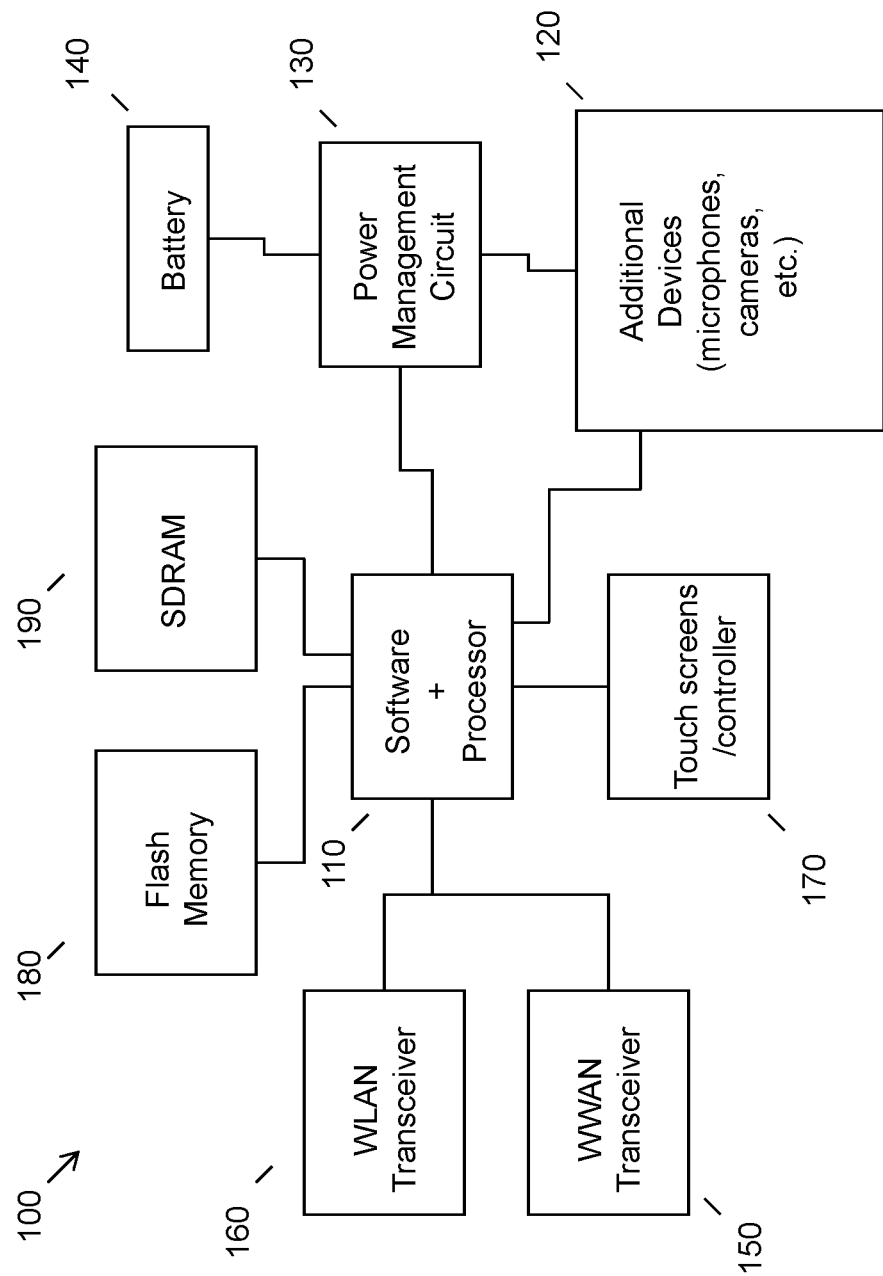
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Mixed meetings are those in which participants may connect to the meeting using various connection mediums. Using a SKYPE meeting as an example, one participant may join the meeting through the SKYPE application directly (i.e., by connecting to the SKYPE meeting via the participant's personal SKYPE profile), another participant may join the SKYPE meeting by calling into the meeting using their personal device (e.g., smart phone, etc.), whereas a group of other participants may join the SKYPE meeting by calling in from a shared device (e.g., a conference phone, etc.). SKYPE is a registered trademark of Microsoft Corporation in the United States and other countries.

The diversity of available connection methods allowed for in mixed meetings enables user to join the mixed meeting using a connection medium that works best for their contextual situation. However, this connection flexibility may not only make it difficult to determine the identities of each participant in attendance at the meeting but it may also make it difficult to determine whether certain "required participants" (i.e., those participants whose input and/or influence may be necessary when discussing certain meeting matters) are in attendance. In these instances, it is not uncommon for a meeting to progress without the required participants in attendance. In such situations, a follow-up meeting may need to be conducted (i.e., when the required participants are present), which wastes a great deal of time for all involved.

Currently, the only solution is to manually query each participant in attendance about their identities. Not only is this time-consuming and burdensome but it may also be very ineffective. More particularly, even if identities could be determined for each present participant, the number of required participants needed during a particular meeting, or needed for discussion of a particular matter, may not be readily apparent (e.g., participants may not know the minimum number of required participants necessary to perform a certain vote, etc.). Additionally, a meeting may initially begin with the required participants in attendance but, throughout the course of the meeting, one or more of these required participants may leave (e.g., due to a bad connection, for another reason, etc.). Current solutions do not provide any indication of this occurrence, which may further result an ineffective meeting (e.g., when a vote is called for and not all required participants are there, etc.).

Accordingly, an embodiment provides a novel method for determining whether all required participants are present in a meeting. In an embodiment, a meeting-based application on a device may initiate, or support, a virtual mixed meeting room that participants can access. An embodiment may identify a list of eligible required participants related to the meeting. An embodiment may also identify the identities for the participants present in a meeting by utilizing one or more identity determination techniques, as further described herein. The list of eligible required participants may then be compared to the list of identified present participants to determine whether a minimum threshold of the required participants is present in the meeting. An embodiment may then perform an action based upon this determination (e.g., provide a notification indicating the number of required participants present in the meeting and/or whether this number satisfies a threshold for a particular meeting matter, delay or pause a meeting if the minimum threshold has not been reached, etc.). Such a method may therefore ensure that each meeting, or each meeting mater, is given its full and appropriate attention by the necessary individuals.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, etc. System 100 often includes one or more touch screens 170 for data input and display/rendering. System 100 also typically includes various memory devices, for example flash memory 180 and SDRAM 190.

Figure 2:
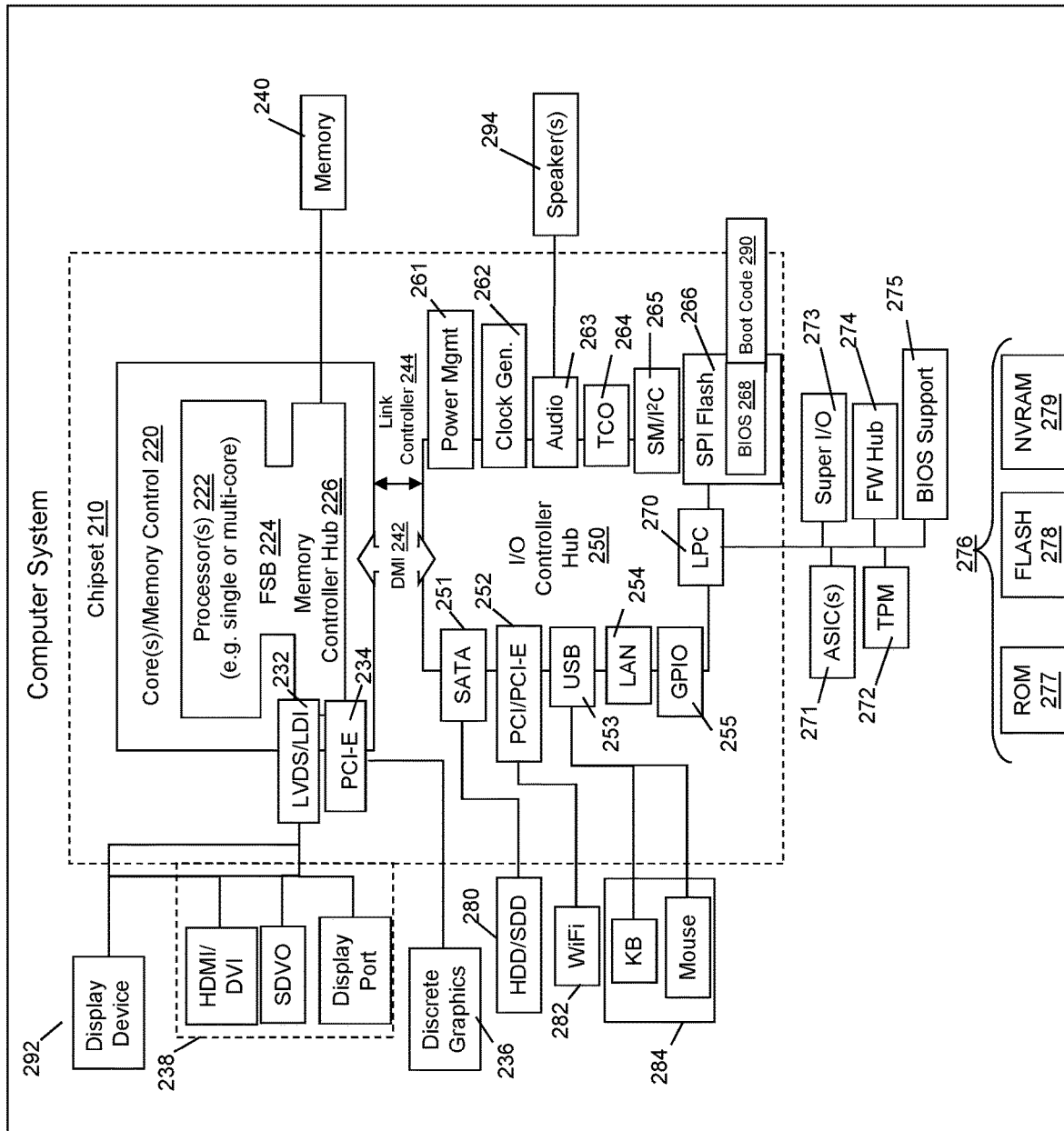
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling circuitry, as for example outlined in FIG. 1 or FIG. 2, may be used in devices capable of supporting mixed meetings. For example, the circuitry outlined in FIG. 1 may be implemented in a smart phone or tablet embodiment, whereas the circuitry outlined in FIG. 2 may be implemented in a laptop.

Figure 3:
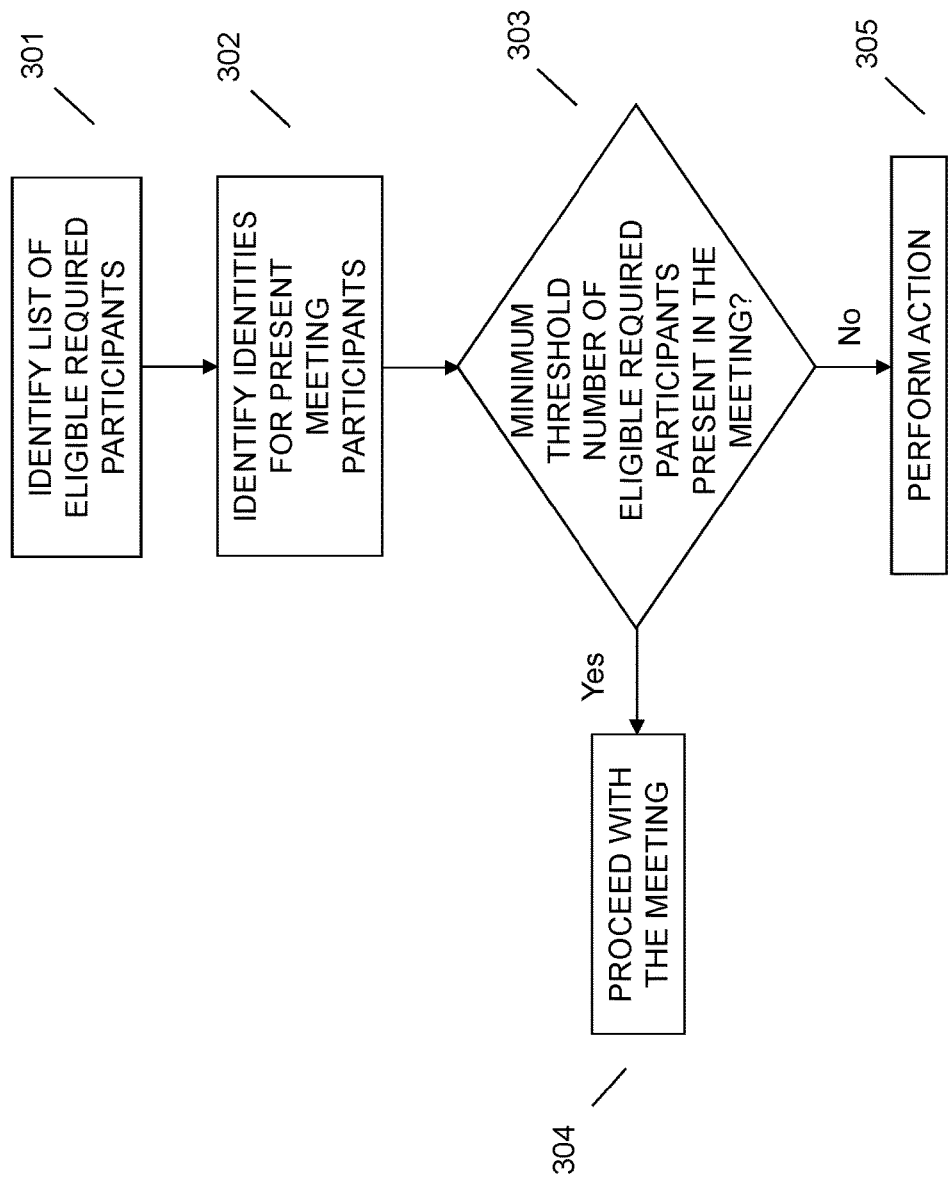
FIG. 3 illustrates an example method of determining whether all required participants are present in a meeting.

Referring now to FIG. 3, an embodiment provides a method for determining whether required participants are present in an online meeting. At 301, an embodiment may identify a list of eligible required participants for a mixed online meeting ("meeting"). In an embodiment, the meeting may be facilitated by utilizing a meeting application resident on a device. As used herein, a meeting may refer to an online meeting in which participants may join the meeting from two or more connection mediums. Non-limiting examples of potential connection mediums include: a profile on the meeting application directly, a personal device (e.g., a phone dial-in from their smart phone, tablet, laptop device, etc.), a shared device (e.g., a conference phone, monitor, or hub, etc.), and the like. Participants in the meeting may provide input to the meeting using whatever input device is available to them (e.g., cameras, microphones, pin-pads, external devices such as a mouse or stylus, etc.).

In the context of this application, an eligible required participant may be an individual whose presence, input, and/or influence may be necessary for a meeting, or a meeting matter (e.g., a discussion regarding a certain topic, a facilitation of a vote, etc.), to be appropriately conducted or discussed. Identification of these required participants may be facilitated by accessing a predetermined ruleset that identifies all eligible required participants for a particular meeting or meeting matter. In an embodiment, the predetermined ruleset may be derived from any number of conventional sources. For example, a calendar invite for the online meeting may explicitly identify which individuals are eligible required participants. As another example, an embodiment may have access to corporate bylaws that identify the particular individuals, or stations/positions, that are considered eligible required participants for each meeting and/or each meeting matter. In an embodiment, this identification may be conducted dynamically and without any additional user input.

It is important to note that not all eligible required participants may need to be in attendance for a certain meeting or meeting matter. For example, a pool of 10 eligible required participants may exist but only 5 of them are needed to be present at a meeting to conduct an official vote. Accordingly, in an embodiment, the predetermined ruleset may identify a threshold minimum number of eligible required participants needed for a particular meeting or meeting matter. The threshold minimum number may correspond to one of: a minimum number of the eligible required participants (e.g., at least 5 eligible required participants from a pool of 10 eligible required participants, etc.) or a minimum percentage of the eligible required participants (e.g., at least 60% of eligible required participants from a pool of 10 eligible required participants, etc.).

At 302, an embodiment may identify identities for present participants in an online meeting. The determination of these identities may be facilitated using one or more different identity determination techniques. These techniques may include, but are not limited to: recognizing a username/passcode pair provided by the participant, recognizing a pin number provided by the participant, obtaining caller identification information associated with the participant, performing vocal or facial recognition of the participant and comparing the results to known audible and/or facial characteristics of a known individual, identifying device network setting information (e.g. identifying a network utilized by the participant to join the meeting, etc.), identifying device proximity information (e.g., identifying which known device signatures are within a predetermined distance of a conferencing hub device, etc.), identifying an input speed of the participant and comparing the input speed to a known individuals' known input speed, identifying word choices utilized by the participant and comparing the identified word choices to an individuals' known and/or frequently used word choices, and the like. Additional details regarding the identity identification process may be found in commonly owned U.S. patent application Ser. No. 16/834,707, filed on Mar. 30, 2020, which is incorporated by reference herein.

At 303, an embodiment may determine whether a minimum threshold number of the eligible required participants are present in the online meeting. This determination may be facilitated by first accessing the predetermined ruleset (i.e., to identify the amount of eligible required participants needed to be present for a particular meeting or meeting matter). Thereafter or substantially concurrently, an embodiment may compare the list of all possible eligible required participants to the identified participants that are present in the meeting. This determination may be conducted once (e.g., at the outset of the meeting, etc.) or may be conducted substantially continuously throughout the meeting at predetermined intervals (e.g., every few seconds, every minute, etc.) or responsive to predetermined events (e.g., after each detection of an individual joining or leaving a meeting, etc.).

Responsive to determining, at 303, that the minimum threshold number of eligible required participants is satisfied for the meeting or the meeting matter, an embodiment may, at 304, proceed with the meeting and essentially take no additional action. Additionally or alternatively, an embodiment may nevertheless perform an action by providing a notification (the substance of which and the method of provision being further described herein) informing the relevant parties of this fact. Conversely, responsive to determining, at 303, that the minimum threshold number of eligible required participants is not satisfied, an embodiment may, at 305, perform an action as further described herein.

In an embodiment, a notification may be provided that informs the relevant individuals about the result of the determination. More particularly, the notification may be provided to all identified present participants, to all present eligible required participants, to all absent eligible required participants, to all expected participants, etc. In an embodiment, the notification may contain a variety of different types of information. For example, the notification may identify whether the minimum threshold number of eligible required participants is met or not. Additionally or alternatively, as another example, the notification may identify one or more of: the minimum threshold number of eligible required participants needed for the particular meeting or meeting matter, a list of all eligible required participants, a list of all invitees that are absent, a list of the eligible required participants that are currently in attendance, a list of all identified individuals currently in attendance, and the like.

In an embodiment, the notification may be provided at predetermined times during the meeting or responsive to predetermined events that occur throughout the meeting. For example, the notification may be provided at the outset of the meeting or at predetermined intervals (e.g., every 5 minutes, every 10 minutes, etc.). Alternatively, the notification may be presented substantially consistently and only the information within the notification may be updated as participants change. In another example, the notification may be provided responsive to an explicit user request to provide the notification (i.e., where the user request is provided using any appropriate input medium available to the user). In yet another example, the notification may be provided each time a participant leaves or joins the meeting or when the minimum number of eligible required participants is no longer satisfied (i.e., because a certain number of eligible required participants have left the meeting).

In an embodiment, the type of notification provided to recipients may be based at least in part on the connection medium they used to access the meeting. For example, if a participant accessed the meeting using a computer, the notification may be presented audibly (e.g., via a soft-sound notification provided over a speaker of the participant's device, etc.) or visually (e.g., via a toast message, model dialog message, in-meeting application, etc.). As another example, if a participant called into the meeting using a telephone device (e.g., smart phone, etc.), then the notification may be provided audibly (e.g., via a soft-sound notification provided over a speaker of the participant's phone, etc.). In yet another example, if participants joined the meeting via a meeting room hub/conference device, the notification may be presented visually on an in-room display screen or audibly at a non-disruptive volume.

An embodiment may take a variety of other actions responsive to determining that the minimum threshold of eligible participants is not satisfied. For example, an embodiment may delay continuance of the meeting until the minimum threshold is satisfied. This delay may be implemented at the outset of the meeting (e.g., if not all of the minimum number of required participants are present, etc.) or may be dynamically implemented at some point while the meeting is occurring (e.g., when a certain number of eligible required participants leave the meeting resulting in the threshold minimum to no longer be satisfied, etc.). This delay may be embodied by a continuing (i.e., until the threshold minimum is satisfied) visual or audible message presented to the participants. In another example, an embodiment may transmit a reminder notification to one or more of the eligible required participants determined to be absent from the meeting.

The various embodiments described herein thus represent a technical improvement to conventional methods for determining whether required participants are present in an online meeting. Using the techniques described herein, an embodiment may be able to identify a list of eligible required participants (e.g., from a predetermined ruleset found in an available source, etc.). An embodiment may then identify identities for the participants that are present in the meeting using one or more identity-determining techniques. Then, an embodiment may determine whether a minimum threshold number of the eligible required participants are present in the online meeting and may thereafter perform an action based upon this determination (e.g., an embodiment may provide a notification of the determination, an embodiment may delay the meeting, an embodiment may reach out to absent required participants, etc.). Such methods may improve meeting flow and ensure that all necessary individuals are in attendance for a particular meeting or for a particular meeting matter.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   identifying, with reference to a predetermined ruleset for an online meeting, a list of eligible required participants, wherein each of the eligible required participants is a vote-enabled individual;
   identifying, using at least one identity-determining technique, identities for present participants in the online meeting;
   determining, with reference to the predetermined ruleset and upon comparison of the list of the eligible required participants to the identified identities of the present participants, that a minimum threshold number of the eligible required participants are present in the online meeting;
   initiating, responsive to the determining, the online meeting;
   identifying, at a point during the online meeting, that the minimum threshold number of the eligible required participants are not present in the online meeting to facilitate a vote on a matter associated with the online meeting; and
   performing an action based upon the determination, wherein the performing the action comprises delaying continuance of the online meeting until the minimum threshold number of the eligible required participants is detected.

2. The method of claim 1, wherein the identifying the identities comprises identifying the identities using at least one identity-determining technique selected from the group consisting of: username/password identification, pin number identification, caller identification, voice recognition, facial recognition, device network setting identification, and device proximity information.

3. The method of claim 1, wherein the minimum threshold number corresponds to one of: a minimum number of the eligible required participants or a minimum percentage of the eligible required participants.

4. The method of claim 1, wherein the determining comprises continuously determining throughout the online meeting and wherein the performing the action comprises performing the action responsive to occurrence of a predetermined event.

5. The method of claim 1, wherein the performing the action comprises providing a notification of the determination.

6. The method of claim 5, wherein the present participants in the online meeting connect to the online meeting using a connection medium type and wherein the notification is of a notification type dictated by the connection medium type.

7. The method of claim 5, wherein the notification is provided to at least one of: the eligible required participants and the present participants.

8. The method of claim 5, wherein the notification provides an indication of at least one of: the list of the eligible required participants, the present participants in the online meeting, the minimum threshold number, and the eligible required participants present in the online meeting.

9. The method of claim 1, wherein the performing the action comprises contact at least one of the eligible required participants determined to not be present at the online meeting.

10. An information handling device, comprising:
    a processor;
    a memory device that stores instructions executable by the processor to:
    identify, with reference to a predetermined ruleset for an online meeting, a list of eligible required participants;
    identify, using at least one identity-determining technique, identities for present participants in the online meeting, wherein each of the eligible required participants is a vote-enabled individual;
    determine, with reference to the predetermined ruleset and upon comparison of the list of the eligible required participants to the identified identities of the present participants, that a minimum threshold number of the eligible required participants are present in the online meeting;
    initiating, responsive to the determining, the online meeting;
    identifying, at a point during the online meeting, that the minimum threshold number of the eligible required participants are not present in the online meeting to facilitate a vote on a matter associated with the online meeting; and
    perform an action based upon the determination, wherein the performing the action comprises delaying continuance of the online meeting until the minimum threshold number of the eligible required participants is detected.

11. The information handling device of claim 10, wherein the instructions executable by the processor to identify comprise instructions executable by the processor to identify the identities using at least one identity-determining technique selected from the group consisting of: username/password identification, pin number identification, caller identification, voice recognition, facial recognition, device network setting identification, and device proximity information.

12. The information handling device of claim 10, wherein the minimum threshold number corresponds to one of: a minimum number of the eligible required participants or a minimum percentage of the eligible required participants.

13. The information handling device of claim 10, wherein the instructions executable by the processor to determine comprise instructions executable by the processor to continuously determine throughout the online meeting and wherein the instructions executable by the processor to perform the action comprise instructions executable by the processor to perform the action responsive to occurrence of a predetermined event.

14. The information handling device of claim 10, wherein the instructions executable by the processor to perform the action comprise instructions executable by the processor to provide a notification of the determination.

15. The information handling device of claim 14, wherein the present participants in the online meeting connect to the online meeting using a connection medium type and wherein the notification is of a notification type dictated by the connection medium type.

16. The information handling device of claim 14, wherein the notification is provided to at least one of: the eligible required participants and the present participants.

17. The information handling device of claim 14, wherein the notification provides an indication of at least one of: the list of the eligible required participants, the present participants in the online meeting, the minimum threshold number, and the eligible required participants present in the online meeting.

18. A product, comprising:
- a storage device that stores code, the code being executable by a processor and comprising:
- code that identifies, with reference to a predetermined ruleset for an online meeting, a list of eligible required participants;
- code that identifies, using at least one identity-determining technique, identities for present participants in the online meeting, wherein each of the eligible required participants is a vote-enabled individual;
- code that determines, with reference to the predetermined ruleset and upon comparison of the list of the eligible required participants to the identified identities of the present participants, that a minimum threshold number of the eligible required participants are present in the online meeting;
- initiating, responsive to the determining, the online meeting;
- identifying, at a point during the online meeting, that the minimum threshold number of the eligible required participants are not present in the online meeting to facilitate a vote on a matter associated with the online meeting; and
- code that performs an action based upon the determination, wherein the performing the action comprises delaying continuance of the online meeting until the minimum threshold number of the eligible required participants is detected.

\* \* \* \* \*